(12) United States Patent
Wolf

(10) Patent No.: US 9,352,791 B2
(45) Date of Patent: May 31, 2016

(54) AIR GUIDING DEVICE

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 14/659,859

(22) Filed: Mar. 17, 2015

(65) Prior Publication Data

US 2015/0274222 A1    Oct. 1, 2015

(30) Foreign Application Priority Data

Mar. 26, 2014    (DE) .................... 10 2014 104 159

(51) Int. Cl.
*B62D 35/00*    (2006.01)
(52) U.S. Cl.
CPC .................... *B62D 35/007* (2013.01)
(58) Field of Classification Search
CPC ............ B62D 35/007; Y10S 180/903
USPC ........................... 296/180.1–180.5
IPC .................................. B60R 27/00
See application file for complete search history.

(56) References Cited

U.S. PATENT DOCUMENTS

| | | | | |
|---|---|---|---|---|
| 3,089,728 A * | 5/1963 | Shumaker | ................. | B60J 1/20 296/91 |
| 3,427,067 A * | 2/1969 | Kish | ................. | B60J 1/2008 296/91 |
| 4,174,863 A * | 11/1979 | Gotz | ................. | B62D 35/007 296/180.5 |
| 4,477,115 A * | 10/1984 | Asakura | ................. | B60J 1/18 180/903 |
| 4,674,788 A * | 6/1987 | Ohmura | ................. | B62D 35/007 296/180.5 |
| 4,881,772 A * | 11/1989 | Feinberg | ................. | B62D 35/007 296/180.1 |
| 5,382,070 A * | 1/1995 | Turner | ................. | B62D 35/007 296/180.1 |
| 5,454,619 A * | 10/1995 | Haraway, Jr. | ................. | B62D 37/02 180/903 |
| 6,273,488 B1 * | 8/2001 | Pike | ................. | B62D 5/083 296/180.1 |
| 6,378,932 B1 * | 4/2002 | Fasel | ................. | B62D 35/001 180/903 |
| 7,029,058 B2 * | 4/2006 | Mathew | ................. | B62D 35/007 296/180.1 |
| 7,226,117 B2 * | 6/2007 | Preiss | ................. | B62D 35/007 296/180.1 |
| 7,878,577 B2 * | 2/2011 | Thomas | ................. | B62D 35/007 296/180.1 |
| 2013/0076064 A1 * | 3/2013 | Smith | ................. | B62D 35/007 296/180.1 |

FOREIGN PATENT DOCUMENTS

DE    10 2008 039 480    2/2010

* cited by examiner

*Primary Examiner* — Pinel Romain

(74) *Attorney, Agent, or Firm* — Gerald E. Hespos; Michael J. Porco; Matthew T. Hespos

(57) ABSTRACT

An air guiding device is provided at a rear end of a motor vehicle and has at least one planar air guiding element that is adjustable from a rest position into a deployed position through a first angle and that is adjustable from the rest position into a lowered position through a second angle.

11 Claims, 2 Drawing Sheets

AIR GUIDING DEVICE

CROSS REFERENCE TO RELATED APPLICATION

This application claims priority under 35 USC 119 to German Patent Appl. No. 10 2014 104 159.3 filed on Mar. 26, 2014, the entire disclosure of which is incorporated herein by reference.

BACKGROUND

1. Field of the Invention. The invention relates to an air guiding device for an arrangement at a rear end of a motor vehicle.

2. Description of the Related Art. Motor vehicles having air guiding devices, such as fixed air guiding devices secured to a motor vehicle rear end are known. In addition, DE 10 2008 039 480 A1 discloses a motor vehicle having an adjustable air guiding device that is adjustable from a rest position into an operating position. As a result, the lift force of the vehicle body caused by air flow is reduced, and so improved transmission of force from driving forces to the road can take place. However, this has an impact on the fuel consumption at high speeds, which will become increasingly decisive in the future.

It is the object of the invention to create an air guiding device that produces increased downthrust in predetermined driving situations, but helps to lower the fuel consumption in other operating situations and other operating situations helps to promote even sportier handling. It is also the object of the invention to create a motor vehicle with an air guiding device that has increased downthrust in predetermined driving situations, but has a reduced fuel consumption in other operating situations and in yet other operating situations exhibits even sportier handling.

SUMMARY OF THE INVENTION

The invention relates to an air guiding device for a rear end of a motor vehicle. The air guiding device has at least one planar air guiding element that is adjustable from a rest position into a deployed position through a first angle and is adjustable from the rest position into a lowered position through a second angle. Thus, in the rest position, increased downthrust can be achieved and in the first position further increased downthrust can be achieved and in the second position reduced air resistance for saving fuel can be achieved.

The first angle may have a different sign than the second angle. The sign of the angle should be determined relative to the rest position. The first position is on one side of the rest position and the second position on the other side of the rest position. Thus, the sign of the angle changes.

The air guiding element may be arranged in a displaceable manner at the rear end of a motor vehicle.

Two air guiding elements which may be arranged in a displaceable manner at the rear end of a motor vehicle. The air guiding elements are arranged alongside one another in the widthwise direction of the motor vehicle. As a result, the two air guiding elements may be narrower and can be separated, for example, by a fixed air guiding element. Alternatively, the air guiding elements can be arranged immediately next to one another.

Two air guiding elements may be jointly adjustable by one actuator. Alternatively, the two air guiding elements can be adjustable by separated actuator units.

The invention also relates to a motor vehicle having an air guiding device that is arranged in a displaceable manner in continuation of the roof line at the rear end of the motor vehicle. The rest position of the at least one air guiding element may be oriented in continuation of the roof line. This has the effect that, in the rest position, the air guiding element continues the roof line in an extended manner substantially at the end of the roof.

The deployed position may be pivoted up through a first angle from the rest position. As a result, the air guiding element projects to a greater extent into the air flow around the vehicle and increases the downthrust.

The lowered position to be a position may be pivoted down through a second angle from the rest position. As a result, the air guiding element projects to a lesser extent into the air flow around the vehicle and reduces the air resistance.

The air guiding element may be adjustable in a speed-dependent manner from the rest position into the second lowered position and/or the air guiding element may be adjustable in a sport mode from the rest position into the first deployed position. Thus, a speed-dependent reduction in the air resistance can be achieved, and the downthrust is increased when the driver desires a sporty drive in the sport mod.

The invention is explained in more detail in the following text by way of an exemplary embodiment with reference to the drawing.

DETAILED DESCRIPTION

Figure 1:
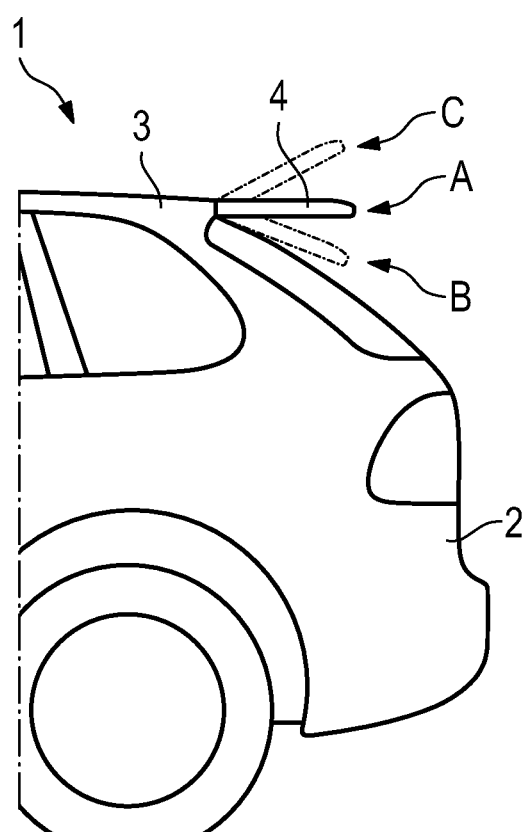
FIG. 1 is a schematic illustration of a vehicle rear end having an air guiding device.

FIG. 1 is a schematic illustration of a vehicle 1 with a vehicle rear end 2 and a roof 3. An air guiding element 4 is arranged in the end region of the roof 3 and is arranged in a pivotable manner in the end region of the roof 3. The pivot axis of the air guiding element 4 is substantially transverse to the longitudinal direction of the vehicle. In FIG. 1, the air guiding element 4 is configured as a planar element that is articulated to the roof 3 in a pivotable manner at its roof-side end.

Three different positions of the air guiding element are drawn in FIG. 1. The middle position A is the rest position, in which the air guiding element is set when the vehicle is at a standstill or is driving slowly or at a particularly high vehicle speed. Thus, the rest position A is for example the position of the air guiding element at low speeds of from 0 km/h to for example about 70 km/h and at high speeds greater than for example about 200 km/h. This setting is assumed in the normal operating mode.

The lower position B is the position in which the air guiding element is pivoted down through the angle β from the rest position A when the vehicle is traveling at an average speed, such as from 70 km/h to for example about 200 km/h. This second lowered position B reduces the air resistance and the fuel consumption at average speeds. This setting is assumed in the normal operating mode.

The upper position C is the deployed position in which the air guiding element is pivoted up through the angle α from the rest position A when the vehicle is switched for example into a sport mode. As a result, increased downthrust is produced. It also is conceivable to allow intermediate positions for example between rest position A and position C. As a result, the downthrust on the rear axle can be set individually for example for engine or vehicle variants.

Figure 2:
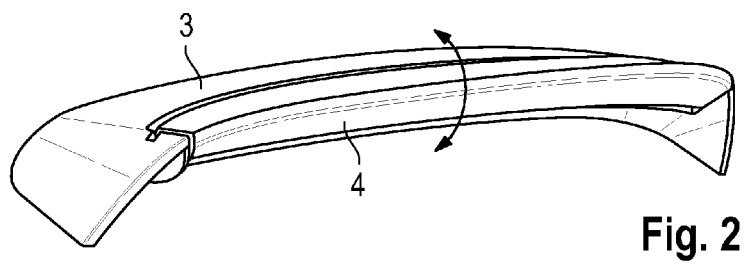
FIG. 2 is a schematic view of an air guiding device in the rest position.
Figure 3:
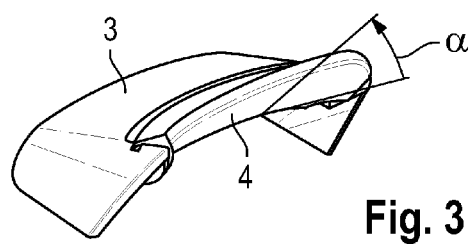
FIG. 3 is a schematic view of an air guiding device in the deployed position.
Figure 4:
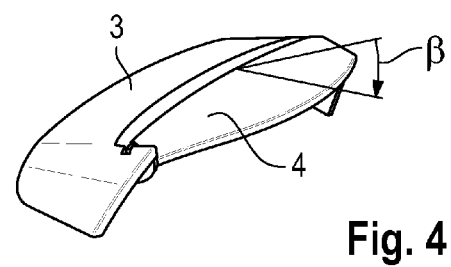
FIG. 4 is a schematic view of an air guiding device in the lowered position.

FIGS. 2 to 4 show the air guiding device 4 in conceivable forms in the end region of the roof. More particularly, FIG. 2 shows the air guiding element 4 arranged in the rest position A, FIG. 3 shows the air guiding element 4 in the deployed position C and FIG. 4 shows the air guiding element 4 in the lowered position B.

Figure 5:
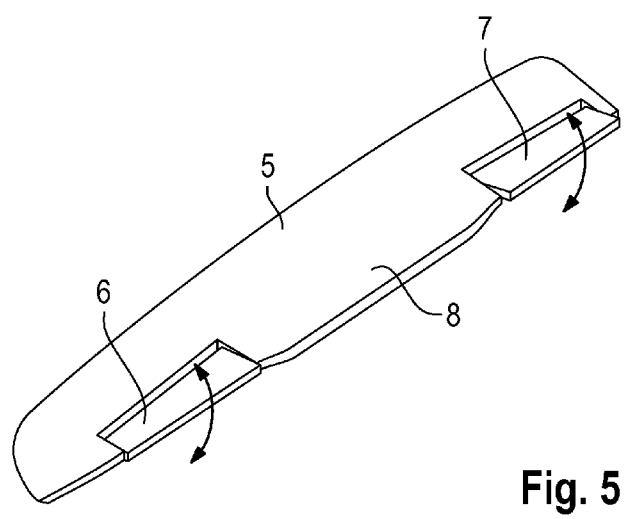
FIG. 5 is a schematic view of an air guiding device having two air guiding elements.

Alternatively to the arrangement of an air guiding element as in FIG. 2, FIG. 5 shows two air guiding elements 6, 7 arranged in the end region of the roof 5 and spaced apart from one another in the transverse direction of the vehicle. A part 8 of the roof is arranged between the two air guiding elements.

What is claimed is:

1. An air guiding device arranged at a rear end of a roof of a motor vehicle, the air guiding device comprising: a fixed component projecting rearward from the roof and extending laterally on the vehicle as an extension of a roof line and at least one planar air guiding element with a front end that is connected pivotally to the fixed component, the air guiding element being adjustable from a rest position where the air guiding element defines a part of the extension of the roof line into a deployed position through a first angle (α) where a rear end of the air guiding element is higher than the front end and that is adjustable from the rest position into a lowered position through a second angle (β) so that the rear end of the air guiding element is lower than the front end.

2. The air guiding device of claim 1, wherein the at least one planar air guiding element comprises two air guiding elements arranged in a widthwise direction of the motor vehicle.

3. The air guiding device of claim 2, wherein the two air guiding elements are jointly adjustable by one actuator unit.

4. The air guiding device of claim 1, wherein the rear end of the air guiding element substantially aligns with a rear end of the fixed component of the air guiding device when the air guiding element is in the rest position.

5. The air guiding device of claim 1, wherein the fixed component of the air guiding device extends laterally of the air guiding element.

6. The air guiding device of claim 5, wherein regions of the fixed component of the air guiding device that extend laterally of the air guiding element are curved downward.

7. A motor vehicle having a rear end and a roof line extending to the rear end, and an air guiding device arranged at the rear end of the roof of the motor vehicle arranged as a continuation of the roof line at the rear end of the motor vehicle, the air guiding device comprising a fixed component projecting rearward from the roof and extending laterally on the vehicle as an extension of a roof line and at least one planar air guiding element with a front end that is connected pivotally to the fixed component, the air guiding element being adjustable from a rest position where the air guiding element defines a part of the extension of the roof line into a deployed position through a first angle (α) where a rear end of the air guiding element is higher than the front end and that is adjustable from the rest position into a lowered position through a second angle (β) so that the rear end of the air guiding element is lower than the front end.

8. The motor vehicle of claim 7, wherein the air guiding element is adjustable in a speed-dependent manner from the rest position into the second lowered position and the air guiding element is adjustable in a sport mode from the rest position into the first deployed position.

9. The motor vehicle of claim 7, wherein the rear end of the air guiding element substantially aligns with a rear end of the fixed component of the air guiding device when the air guiding element is in the rest position.

10. The motor vehicle of claim 7, wherein the fixed component of the air guiding device extends laterally of the air guiding element.

11. The motor vehicle of claim 10, wherein regions of the fixed component of the air guiding device that extend laterally of the air guiding element are curved downward.

* * * * *